US012198361B2

United States Patent
Tian et al.

(10) Patent No.: US 12,198,361 B2
(45) Date of Patent: Jan. 14, 2025

(54) ANTI-SPOOFING 3D FACE RECONSTRUCTION USING INFRARED STRUCTURE LIGHT

(71) Applicant: NEC Laboratories America, Inc., Princeton, NJ (US)

(72) Inventors: Yue Tian, Princeton, NJ (US); Ting Wang, West Windsor, NJ (US); Shengtao Sun, Glassboro, NJ (US)

(73) Assignee: NEC Corporation, Tokyo (JP)

( * ) Notice: Subject to any disclaimer, the term of this patent is extended or adjusted under 35 U.S.C. 154(b) by 491 days.

(21) Appl. No.: 17/321,479

(22) Filed: May 16, 2021

(65) Prior Publication Data

US 2021/0358149 A1    Nov. 18, 2021

Related U.S. Application Data

(60) Provisional application No. 63/026,351, filed on May 18, 2020.

(51) Int. Cl.
| | |
|---|---|
| G06V 40/16 | (2022.01) |
| G02B 26/08 | (2006.01) |
| G02B 27/09 | (2006.01) |
| G06N 3/04 | (2023.01) |
| G06T 7/521 | (2017.01) |

(52) U.S. Cl.
CPC .......... *G06T 7/521* (2017.01); *G02B 26/0833* (2013.01); *G02B 27/0927* (2013.01); *G06N 3/04* (2013.01); *G06V 40/166* (2022.01); *G06T 2207/10048* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| 11,982,805 | B2 * | 5/2024 | Hwangbo | ............. G01S 17/931 |
| 2015/0339471 | A1 * | 11/2015 | Bennett | ................... G06F 21/32 |
| | | | | 726/19 |
| 2017/0249501 | A1 * | 8/2017 | Van Der Sijde | ..... G06V 40/172 |
| 2017/0257770 | A1 * | 9/2017 | Derakhshani | ....... H04W 12/122 |
| 2018/0307895 | A1 * | 10/2018 | Chu | ......................... G06T 7/60 |
| 2018/0343401 | A1 * | 11/2018 | Campbell | ............ H04N 25/131 |
| 2019/0166348 | A1 * | 5/2019 | Kempf | ................. H04N 13/204 |

(Continued)

OTHER PUBLICATIONS

Şengür, Abdulkadir, et al. "Deep feature extraction for face liveness detection." 2018 International Conference on Artificial Intelligence and Data Processing (IDAP). Ieee, 2018. (Year: 2018).*

(Continued)

*Primary Examiner* — Sean M Conner
(74) *Attorney, Agent, or Firm* — Joseph Kolodka

(57) ABSTRACT

Aspects of the present disclosure describe systems, methods, and structures for anti-spoofing 3D face reconstruction using infrared structured light that advantageously reconstructs 3D face structures for facial recognition and detect face surface material(s) such that human skin may be effectively distinguished from artifacts thereby providing additional security for facial recognition including immunity from 2D/3D print attacks including face masks and special make-ups.

1 Claim, 4 Drawing Sheets

(56) References Cited

U.S. PATENT DOCUMENTS

2019/0213309 A1\* 7/2019 Morestin ............... G01S 17/04
2021/0262787 A1\* 8/2021 Hirose ............... G01B 11/2513

OTHER PUBLICATIONS

Kim, Yoonsik, Insung Hwang, and Nam Ik Cho. "Convolutional neural networks and training strategies for skin detection." 2017 IEEE international conference on image processing (ICIP). IEEE, 2017. (Year: 2017).\*

\* cited by examiner

ANTI-SPOOFING 3D FACE RECONSTRUCTION USING INFRARED STRUCTURE LIGHT

CROSS REFERENCE

This disclosure claims the benefit of U.S. Provisional Patent Application Ser. No. 63/026,351 filed May 18, 2020 the entire contents of which is incorporated by reference as if set forth at length herein.

TECHNICAL FIELD

This disclosure relates generally to biometric detection. More particularly it pertains to systems, methods and structures providing anti-spoofing 3D face reconstruction using infrared structured light.

BACKGROUND

As is known, facial recognition has become one of the most popular approaches to biometric detection of persons. However, face recognition techniques based on 2D imaging or 3D reconstruction are prone to be deceived by print attacks, such as 2D photo or video playback, 3D realistic face masks and special make-ups.

SUMMARY

The above problems are solved and an advance in the art is made according to aspects of the present disclosure directed to systems, methods and structures exhibiting an anti-spoofing 3D face reconstruction using infrared (IR) structured light.

In sharp contrast to the prior art, systems, methods and structures according to aspects of the present disclosure advantageously reconstruct 3D structure(s) of faces for face recognition and simultaneously detects face surface material so as to effectively distinguish human skin from artifacts.

As a result, systems, methods, and structures according to aspects of the present disclosure provide additional security enhancements to facial recognition by detecting 2D/3D print attacks, such as face masks and special make-ups. Of particular interest, such systems, methods, and structures according to aspects of the present disclosure may be advantageously performed without additional, expensive hardware.

BRIEF DESCRIPTION OF THE DRAWING

A more complete understanding of the present disclosure may be realized by reference to the accompanying drawing in which.

Figure 1:
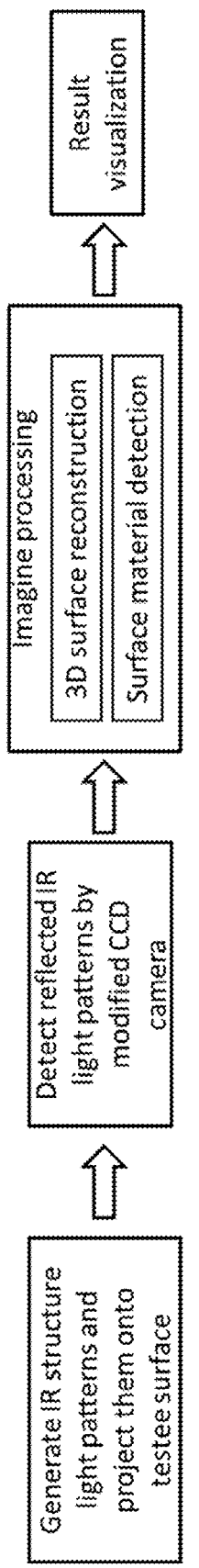
FIG. 1 shows a schematic diagram of an illustrative process for anti-spoofing 3D face reconstruction using infrared structured light according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

As previously noted, aspects of the present disclosure are directed to an anti-spoofing 3D face reconstruction system using infrared (IR) structured light which simultaneously reconstructs 3D structures of faces for face recognition and detect face surface material so as to effectively distinguish human skin from artifacts.

As a result, systems, methods, and structures according to the present disclosure advantageously provide additional security enhancements to face recognition and detect/foil 2D/3D print attacks, such as face masks and special make-ups.

Of particular interest, systems, methods, and structures according to aspects of the present disclosure employ an Infrared (IR) structured light source, the light emitted from which is strongly absorbed by water molecules in human skin—but reflected by other materials that do not contain as much water as human skin. By quantitatively analyzing an infrared light signal strength absorbed/reflected by surface material of an item of interest, our inventive systems, methods, and structures can distinguish human skins from artifacts.

By using IR light source for structured light generation, 3D face recognition and surface material detection may advantageously be performed simultaneously—without requiring any specialized, expensive hardware.

FIG. 1 shows a schematic diagram of an illustrative process for anti-spoofing 3D face reconstruction using infrared structured light according to aspects of the present disclosure.

With reference to that figure, we note that to reconstruct a 3D face surface and detect whether surface material is a human skin, a sequence of IR structured light patterns is generated and projected onto an object to be tested—i.e., a face for facial recognition.

We note that human faces and human skin exhibit several distinctive properties. Of particular importance to the present disclosure, human skin can produce many optical properties. Infrared radiation (IR) reflection shows correlation with the water content. Under given conditions, IR reflection decreases with higher water content. Wavelength of IR is close to visible light which makes it possible to be seen by regular camera with minimum modification.

Figure 2:
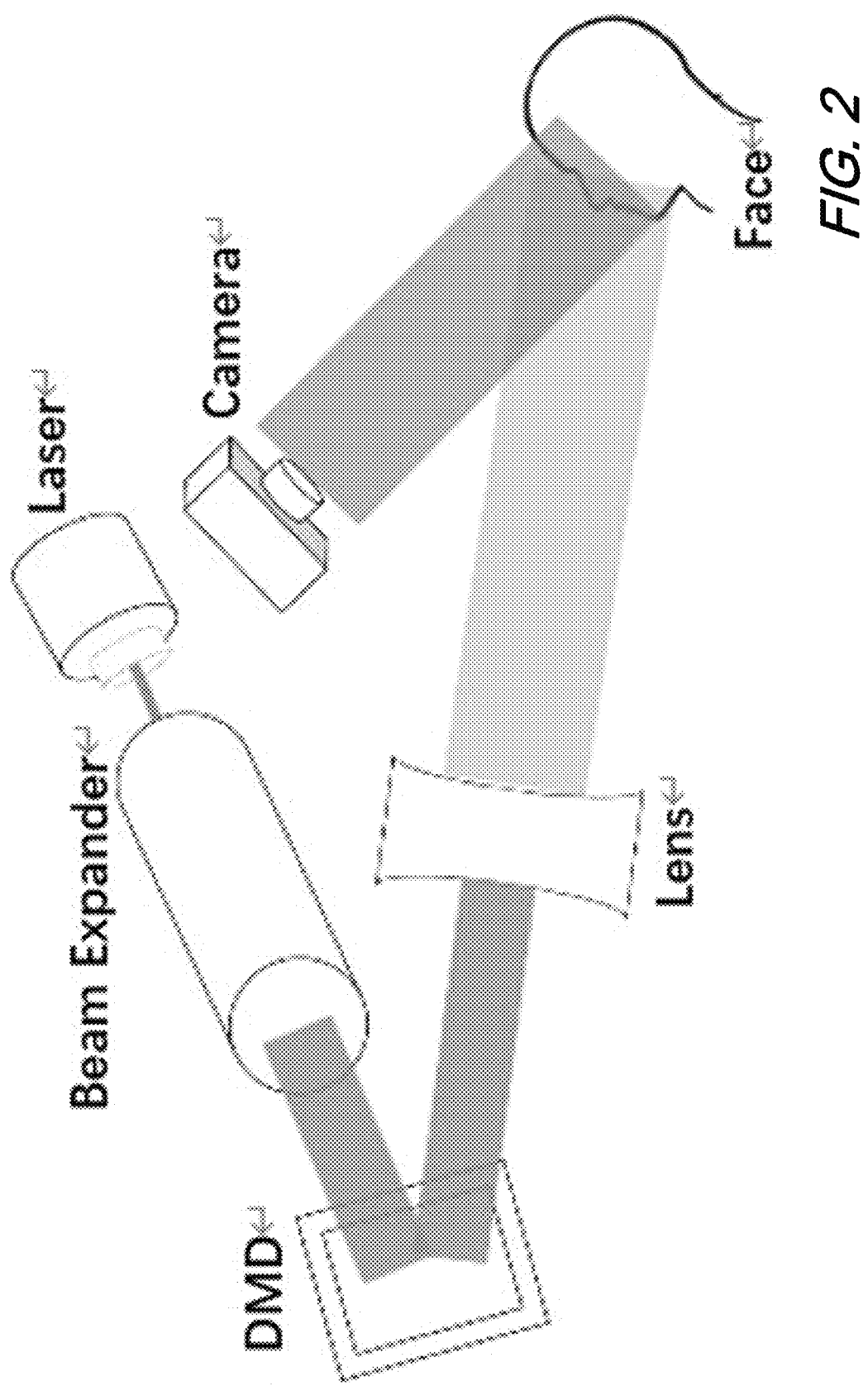
FIG. 2 shows a schematic diagram of an illustrative hardware arrangement for anti-spoofing 3D face reconstruction using infrared structured light according to aspects of the present disclosure.

FIG. 2 shows a schematic diagram of an illustrative hardware arrangement for anti-spoofing 3D face reconstruction using infrared structured light according to aspects of the present disclosure. As shown in that figure, the experimental arrangement includes a laser light source such as an LED Laser diode providing an output at ~980 nm. The output light is directed into a coated collimator and then expended through the effect of a beam expander. The expanded light is then directed to a digital micromirror device which generates a video display image through the effect of a plurality of micromirrors. Shown further in the figure, the light is then directed through a concave lens for further enlargement of the light beam.

The capture setup employed experimentally may be located several meters from the light source which may be adjustable depending on the size of the light pattern required to illuminate the entire face under examination. Experimentally, the camera employed was a standard camera used—for example—as a WEB cam. Since we are interested in IR wavelengths, any IR filter(s) on the camera were removed for our experiments.

Note that since the wavelengths of interest lie in the IR portion of the electromagnetic spectrum, visible light can have a negative impact on the quality of images having IR structured light patterns illuminating the face under test. Accordingly, we add a visible light filter for the webcam to minimize any interference from visible light.

The light patterns reflected by the object are received by a modified CCD camera, converted into digital data and input to image processing software module. In the image processing software, the shape distortions of the reflected light patterns are used to reconstruct 3D surface, while the IR light intensity and texture information are used to detect the material types of the surface. Eventually, the non-skin area is highlighted on the reconstructed 3D surface for visualization.

While not specifically shown in the figure, our experiments included face(s) covered with different types of non-skin materials. In particular, we used a cosmetic foundation material and a piece of latex material cut from a 3D face mask. Our reconstruction results showed that such materials can be readily determined and distinguished from normal human skin. An analysis of images captured and processed by convolutional neural network highlights legible contours of suspicious areas where the non-human skin materials are placed.

Our experiments demonstrate an anti-spoofing method and apparatus for face recognition that can detect potential 3D printing attacks and the presence of make-up materials intended to spoof a facial recognition process. From disguised faces, our method can advantageously reconstruct a spatial structure of the face and analyze reflection information on IR. Reconstruction of the face is obtained by triangulation of images marked by structured light patterns and suspicious areas are cropped by segmentation using a CNN. Our method advantageously detects artificial materials such as latex and cosmetic compositions including foundations which are common for facial disguises.

Broadly speaking—and according to aspects of the present disclosure—to reconstruct 3D face surface and detect whether the surface material is human skin, a sequence of IR structured light patterns is generated and projected onto an object to be tested, e.g. a face for face recognition. The light patterns reflected by the object are received by a modified CCD camera, converted into digital data and input to an image processor including software. In the image processor, the shape distortions of the reflected light patterns are used to reconstruct a 3D surface, while the IR light intensity and texture information are used to detect the material types of the surface. Eventually, the non-skin area is determined and subsequently highlighted on a reconstructed 3D surface where it may be viewed.

Figure 3:
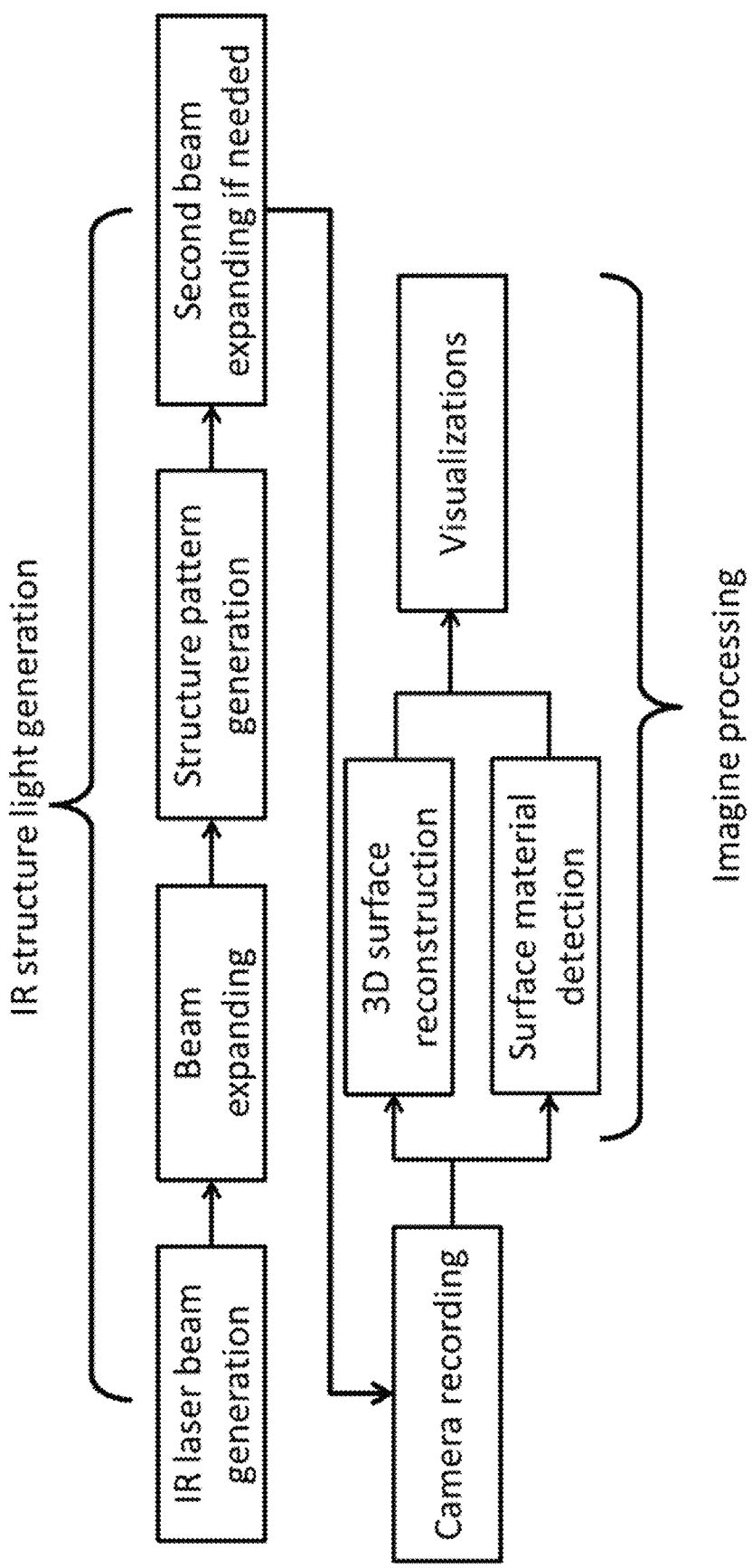
FIG. 3 shows a schematic block diagram of illustrative processes for anti-spoofing 3D face reconstruction using infrared structured light according to aspects of the present disclosure.

FIG. 3 shows a schematic block diagram of illustrative processes for anti-spoofing 3D face reconstruction using infrared structured light according to aspects of the present disclosure. At the highest lever, the processes include IR structured light generation and Image processing.

IR structured light processing—as indicated by our experimental discussion—generally includes IR laser beam generation, beam expansion, structure pattern generation, and if needed, a second beam expansion depending upon the size of the object of interest under examination.

An image(s) of the object is/are produced, and the image processing generally includes 3D surface reconstruction and simultaneously, surface material detection. The reconstructed 3D surface and material detection are combined into visual output(s) for subsequent evaluation.

As shown in FIG. 3, an illustrative hardware arrangement according to aspects of the present disclosure includes an IR laser, a beam expander, a digital micromirror device (DMD) and lens to generate IR structure light patterns and project them onto an object under test, e.g. face. A modified CCD camera is used to capture reflected light patterns and convert them into digital data for processing by an image processor and generate a reconstructed 3D surface and surface material analysis, visually overlaid on one another for analysis.

Operationally, an IR laser at 980 nm (or other wavelength that is detectable by CCD camera) generates a continuous-wave laser beam, which is directed into a beam expander.

The beam expander expands a light spot size of the light beam, such that it will cover an operation area of a digital micromirror device (DMD).

The DMD receives the expanded light and includes an array(s) of micromirror(s) that are configurable to individually switch on/off at high speed, so as to reflect a sequence of different light patterns (structured light patterns) generated from the light received from the beam expander and applied to the DMD as an input light beam.

If necessary, the structured light patterns are further expanded in beam spot size by a lens to a size appropriate to adequately cover the object under test.

Structured light patterns reflected by the object under test are detected/captured/digitally imaged by a modified CCD camera. The CCD is modified—if necessary—such that it can detect the output wavelength of the IR laser. Modification may include removing an IR filter from within the camera or replacing the IR filter with an IR filter having a transparent window at the laser wavelength.

Digital images of the reflected structured light patterns are processed by an image processor, generally programmed to perform such functions.

The image processor uses any distortion information of the reflected structure light patterns to reconstruct 3D surface(s) by triangulation.

Simultaneously, light intensity and texture information of reflected structured light patterns are used to detect non-skin areas on the surface by a trained convolutional neural network.

To visualize the result, non-skin segments/areas are marked or highlighted on the reconstructed 3D surface—output as a visual image either electronic or hard copy.

Figure 4:
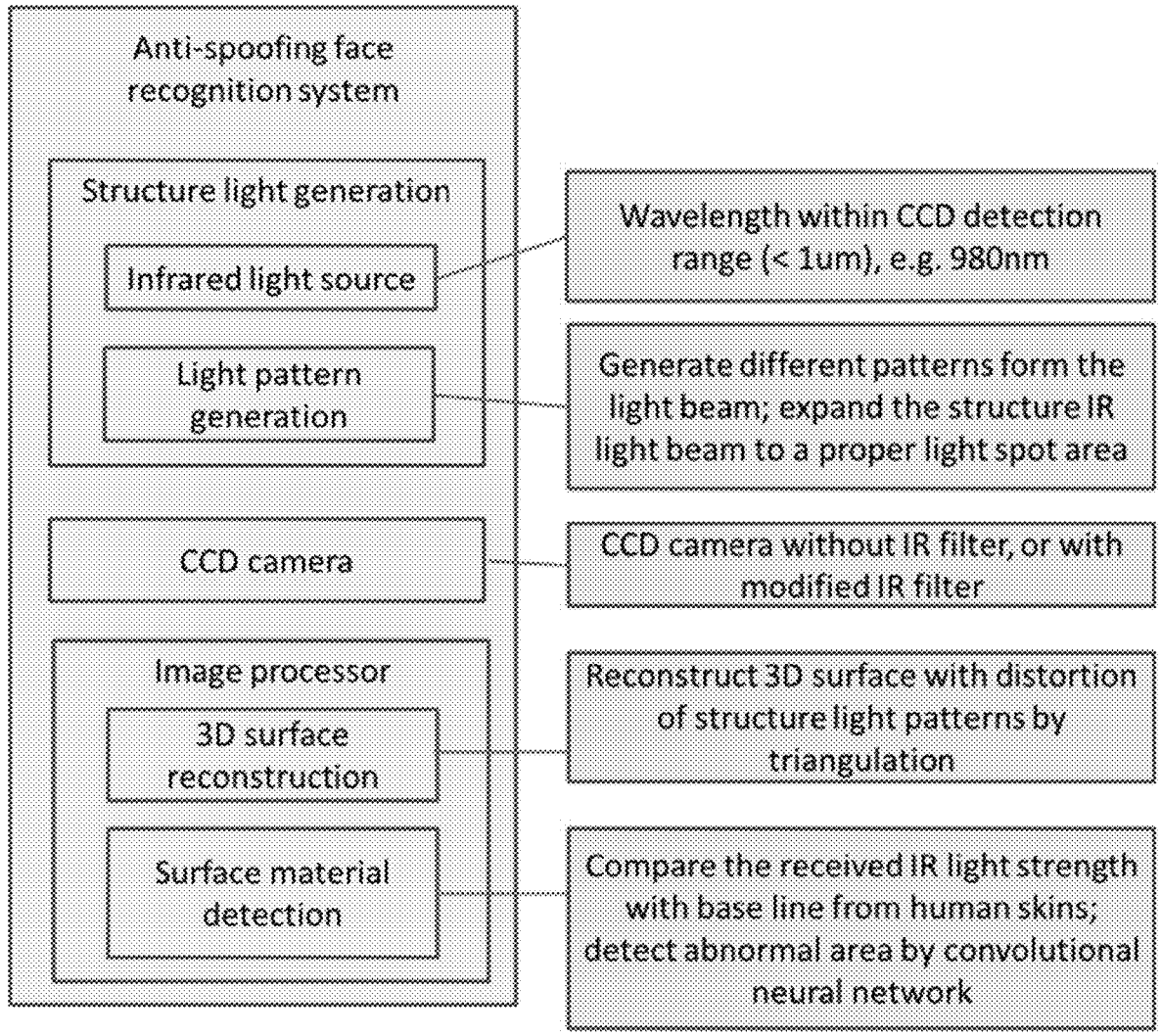
FIG. 4 shows a schematic block diagram of an illustrative arrangement for anti-spoofing 3D face reconstruction using infrared structured light according to aspects of the present disclosure.

FIG. 4 shows a schematic block diagram of an illustrative arrangement for anti-spoofing 3D face reconstruction using infrared structured light according to aspects of the present disclosure.

The structured light generation includes an infrared light source, and light pattern generation. The light beam(s) produced from the infrared source will generally exhibit a wavelength within CCD detection range of approximately (<1 μm), for example a wavelength of 980 nm. The light pattern generation generates patterns from the IR light beam and expand the structured IR light beam to an appropriate light spot area size—that is generally dependent upon the size of the object under test.

The CCD camera may advantageously be a normal CCD camera without an IR filter, or with a modified IR filter depending upon the particular application requirements. Advantageously, our experiments were satisfactorily performed using an inexpensive Web-type camera (WEBCAM).

As noted previously, an image processor will perform 3D surface reconstruction and surface material detection. The 3D surface reconstruction will reconstruct 3D surface with any distortion(s) of structured light patterns by triangulation. The surface material detection will compare the received IR light strength with base line(s) from human skin, and detect any abnormal area(s) through the effect of a convolutional neural network (CNN).

At this point, while we have presented this disclosure using some specific examples, those skilled in the art will recognize that our teachings are not so limited. Accordingly, this disclosure should be only limited by the scope of the claims attached hereto.

The invention claimed is:

1. An anti-spoofing 3D face reconstruction system comprising:
   a structured light generator including an infrared laser light source configured to generate infrared light at 980 nm and a light pattern generator configured to generate different structured patterns of the generated infrared light, the light pattern generator including a digital multimirror device (DMD) configured to generate a plurality of structured light patterns from received light;
   a light beam expander interposed between the infrared laser light source and light pattern generator, the light beam expander configured to expand a beam of infrared light generated by the light generator;
   a camera configured to detect and digitally image the different structured patterns after they are reflected from an object comprising a face;
   a second light beam expander consisting of a double concave lens interposed between the structured light generator and the face, the second light beam expander configured to further expand a structured IR light beam to a proper light spot area for the face; and
   an image processor configured to generate a 3D surface reconstruction of the face from the digital images of the reflected structured patterns and simultaneously detect a surface material of the face;
   wherein the image processor reconstructs the 3D surface of the face including any distortion of the structured light patterns by triangulation, determines the surface material by comparing a strength of the reflected structured patterns of infrared (IR) light with a baseline strength of human skin, detects abnormal areas by a convolutional neural network (CNN) as part of the surface material detection, and marks or highlights the detected abnormal areas as non-skin segments/areas on the reconstructed 3D surface.

* * * * *